United States Patent
Wu

(10) Patent No.: US 6,298,758 B1
(45) Date of Patent: Oct. 9, 2001

(54) LATHE WITH A POLYGON MACHINING DEVICE

(76) Inventor: Hsuan-Lung Wu, No. 4-6, Le-Tien Lane, Fang-Shu Li, Nan-Tun Dist., Taichung City (TW)

(*) Notice: Subject to any disclaimer, the term of this patent is extended or adjusted under 35 U.S.C. 154(b) by 0 days.

(21) Appl. No.: 09/573,691

(22) Filed: May 19, 2000

(51) Int. Cl.[7] ...................................................... B23B 7/14
(52) U.S. Cl. ................................ 82/117; 82/118; 82/121; 82/137
(58) Field of Search .............................. 82/117, 118, 121, 82/132, 137, 138, 141, 142, 144, 149, 1.3, 1.4, 1.5

(56) References Cited

U.S. PATENT DOCUMENTS

| | | | |
|---|---|---|---|
| 4,413,539 | * 11/1983 | Ishizuka et al. ....................... 82/120 |
| 5,490,307 | 2/1996 | Link ........................................ 29/27 |
| 6,173,630 | * 1/2001 | Wu ......................................... 82/129 |

* cited by examiner

Primary Examiner—Henry Tsai
(74) Attorney, Agent, or Firm—Ohlandt, Greeley, Ruggiero & Perle, L.L.P.

(57) ABSTRACT

A lathe includes a polygon machining cutter unit and a turret unit, which are attached to a cutter carrying plate that can be driven to move on a machine body in longitudinal and transverse directions of a spindle. The spindle is connected mechanically to a cutter shaft of the cutter unit by means of a transmission, which includes a rigid driving shaft, a rigid driven shaft, and first and second gearings. The driving shaft and the driven shaft extend respectively on the machine body in the longitudinal and transverse directions of the spindle, and are interconnected by the first gearing. The second gearing interconnects the driven shaft and the cutter shaft for transferring rotation therebetween.

4 Claims, 6 Drawing Sheets

LATHE WITH A POLYGON MACHINING DEVICE

BACKGROUND OF THE INVENTION

1. Field of the Invention

This invention relates to a lathe, more particularly to a lathe, which is provided with a polygon machining device that is used to machine a workpiece, such as a nut or a headed bolt.

2. Description of the Related Art

Referring to FIG. 1, a conventional polygon machining device 10 is shown to include a machine body 11, a right gear box 12, a rail member 13, a cutter carrying plate 14, a left gear box 15, three cutters 16 (see FIG. 2), and a universal connecting rod 17. A spindle 121 and a driving shaft 122 are journalled on the machine body 11. A chuck 123 is mounted on an end of the spindle 121 for holding a workpiece 18 (see FIG. 2) to be machined. A cutter shaft 151 is driven by the left gear box 15. A driven shaft 152 is driven by the universal connecting rod 17, and is connected operably to the left gear box 15. The cutters 16 are fixed on a cutter mounting disc 153, which is connected fixedly on the cutter shaft 151. When the spindle 123 rotates, it activates the driving shaft 122 via the right gear box 12, thereby rotating the cutter shaft 151, the cutter mounting disc 153 and the cutters 16 through a transmission line of the universal connecting rod 17, the driven shaft 152 and the left gear box 15. The aforesaid device 10 suffers from the following disadvantages:

(1) When the position of the cutter carrying plate 14 is adjusted in an axial or radial direction of the spindle 121, the universal connecting rod 17 flexes, thereby resulting in unsmooth rotation of the spindle 121 and the cutter shaft 151. Furthermore, because the length of the universal connecting rod 17 is limited, and because the device 10 can only be used to machine a workpiece, which is shorter than the universal connecting rod 17, the application range of the device 10 is reduced.

(2) To form a nut or a headed bolt, a workpiece has to be machined on the device 10 and a lathe for forming threads, thereby resulting in an increase in the machining costs, the machine-occupied space and the tool-changing time.

U.S. Pat. No. 5,490,307 disclosed an improved lathe, which is provided with a polygon machining device to overcome the above-mentioned problems. In the improved lathe, a spindle and a polygon machining cutter unit are driven respectively by different driving sources at different rotational-speed ratios, and have no mechanical transmission therebetween. As a result, when the feeding distance of the polygon machining cutter unit is relatively large or when the material of a workpiece to be machined is relatively hard, the feeding of the cutter unit is delayed, thereby resulting in failure to form an accurate polygon on the workpiece.

SUMMARY OF THE INVENTION

The object of this invention is to provide a lathe with a polygon machining device, which includes a spindle and a polygon machining cutter unit that are driven by the same driving source and that have a mechanical transmission therebetween, thereby feeding the cutter unit positively.

According to this invention, a lathe has a machine body including a spindle that is journalled thereon, and a chuck that is adapted to hold a workpiece to be machined. A transverse rail member is disposed slidably on the machine body, and extends in a transverse direction relative to the spindle. The rail member is movable on the machine body along a longitudinal direction of the spindle. A cutter carrying plate is disposed slidably on the rail member, and is movable along a longitudinal direction of the rail member. A turret unit is attached to the carrying plate, and is adapted to lathe the workpiece. A polygon machining cutter unit is attached to the carrying plate, and is spaced apart from the turret unit in the longitudinal direction of the rail member. The polygon machining cutter unit is adapted to form a plane on the workpiece. A cutter shaft is attached fixedly to the polygon machining cutter unit, and is disposed parallel to the spindle. A rigid driving shaft is journalled on the machine body, and is disposed parallel to the spindle. A driving source is used for rotating the spindle. A clutch device is movable between a connecting position, where rotation is transferred between the spindle and the driving shaft so as to rotate the driving shaft, and a disconnecting position, where rotation of the driving shaft is stopped. A rigid driven shaft is journalled on the machine body, and extends in the transverse direction relative to the spindle. A first gearing interconnects the driving shaft and the driven shaft, and is movable on the driving shaft for transferring rotation from the driving shaft to the driven shaft. A second gearing interconnects the driven shaft and the cutter shaft, and is movable on the driven shaft for transferring rotation from the driven shaft to the cutter shaft.

Because the driving shaft, the first gearing, the driven shaft and the second gearing constitute cooperatively a mechanical transmission between the cutter shaft and the spindle, the cutter unit can be fed at appropriate times, thereby forming an accurate polygon on the workpiece.

BRIEF DESCRIPTION OF THE DRAWINGS

These and other features and advantages of this invention will become apparent in the following detailed description of the preferred embodiment of this invention, with reference to the accompanying drawings, in which.

DETAILED DESCRIPTION OF THE PREFERRED EMBODIMENT

Figure 1:
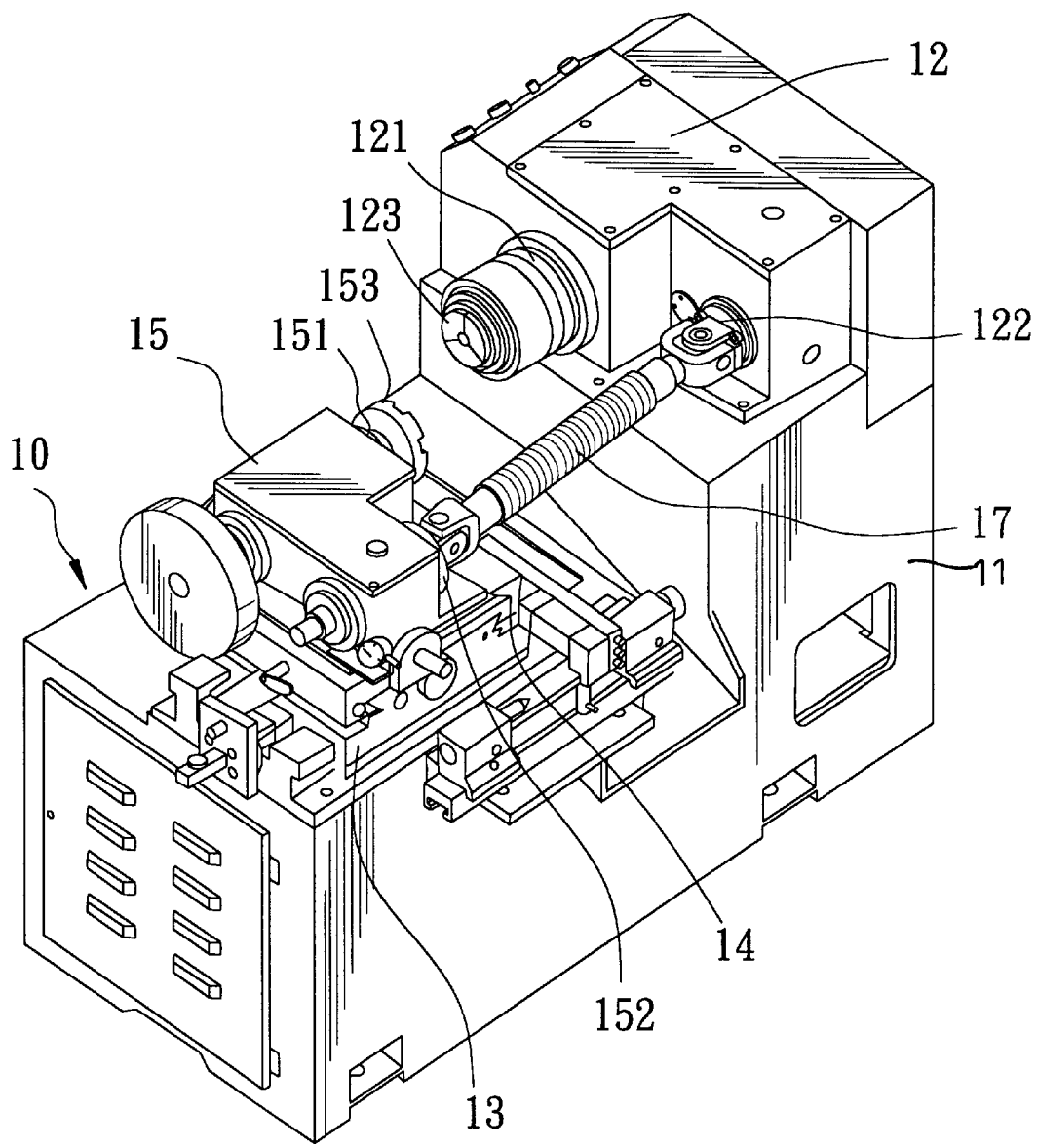
FIG. 1 is a perspective view of a conventional polygon machining device.
Figure 2:
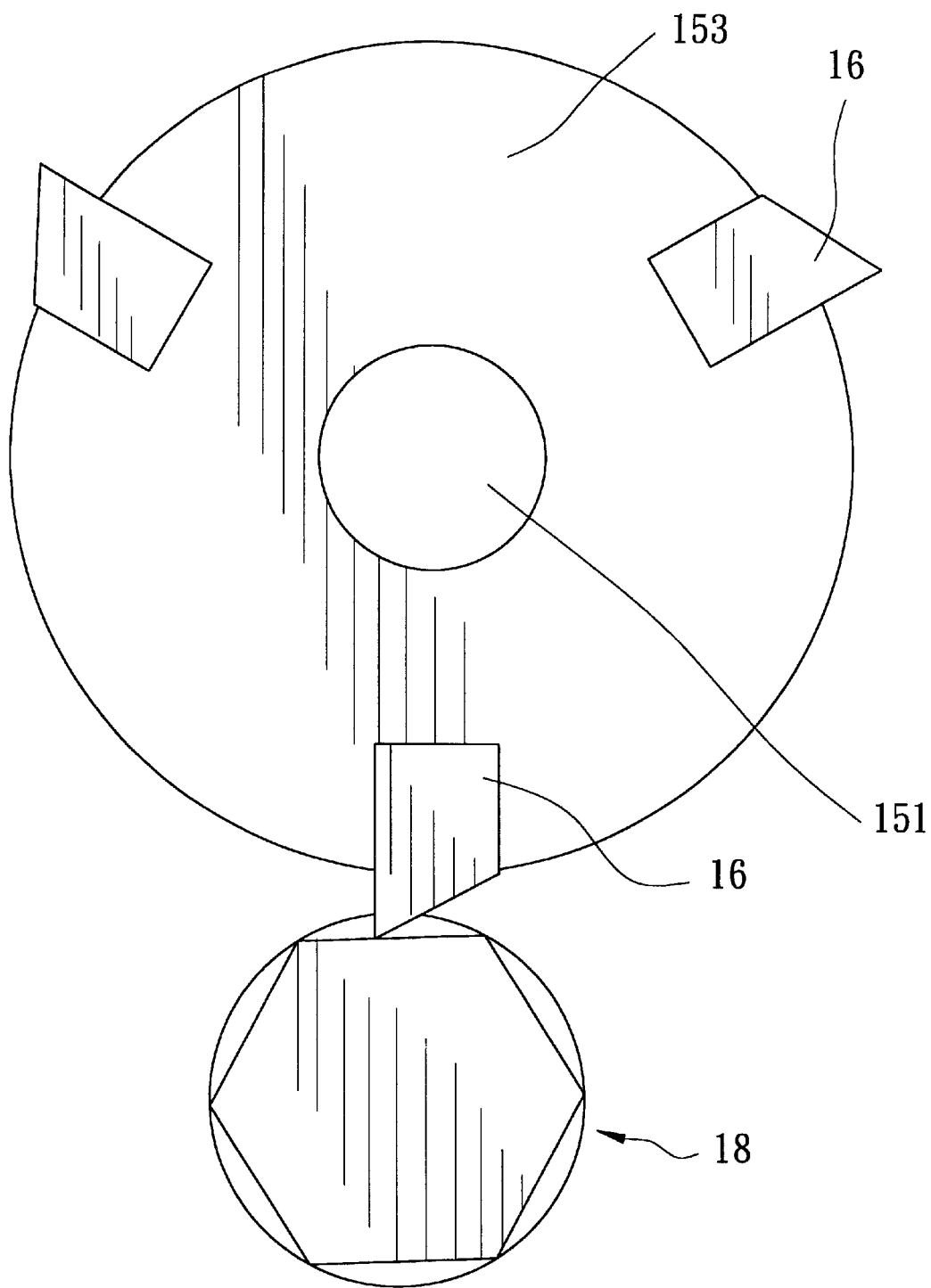
FIG. 2 is a schematic view illustrating how a workpiece is machined by the conventional polygon machining device.
Figure 3:
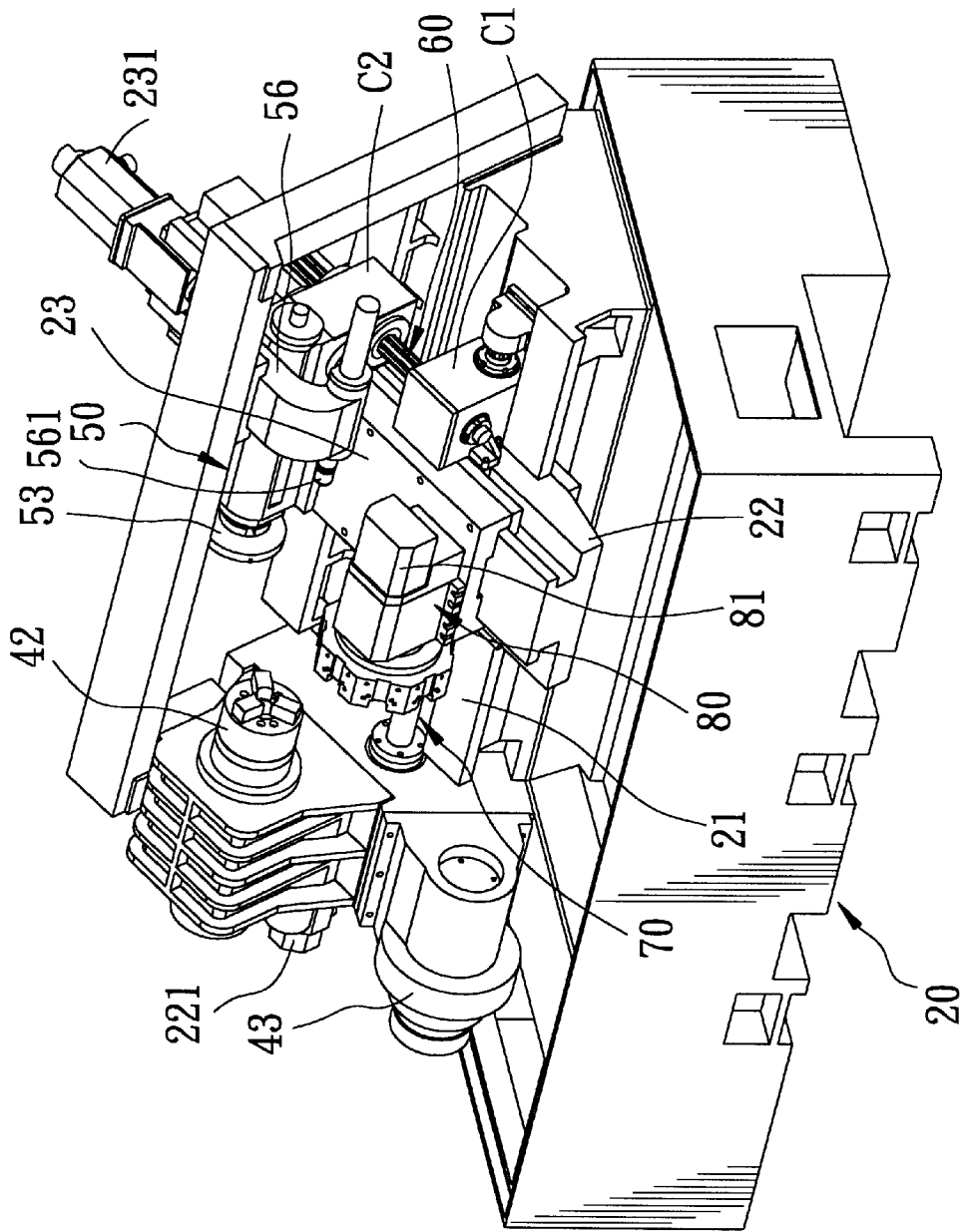
FIG. 3 is a perspective view of the preferred embodiment of a lathe according to this invention.
Figure 4:
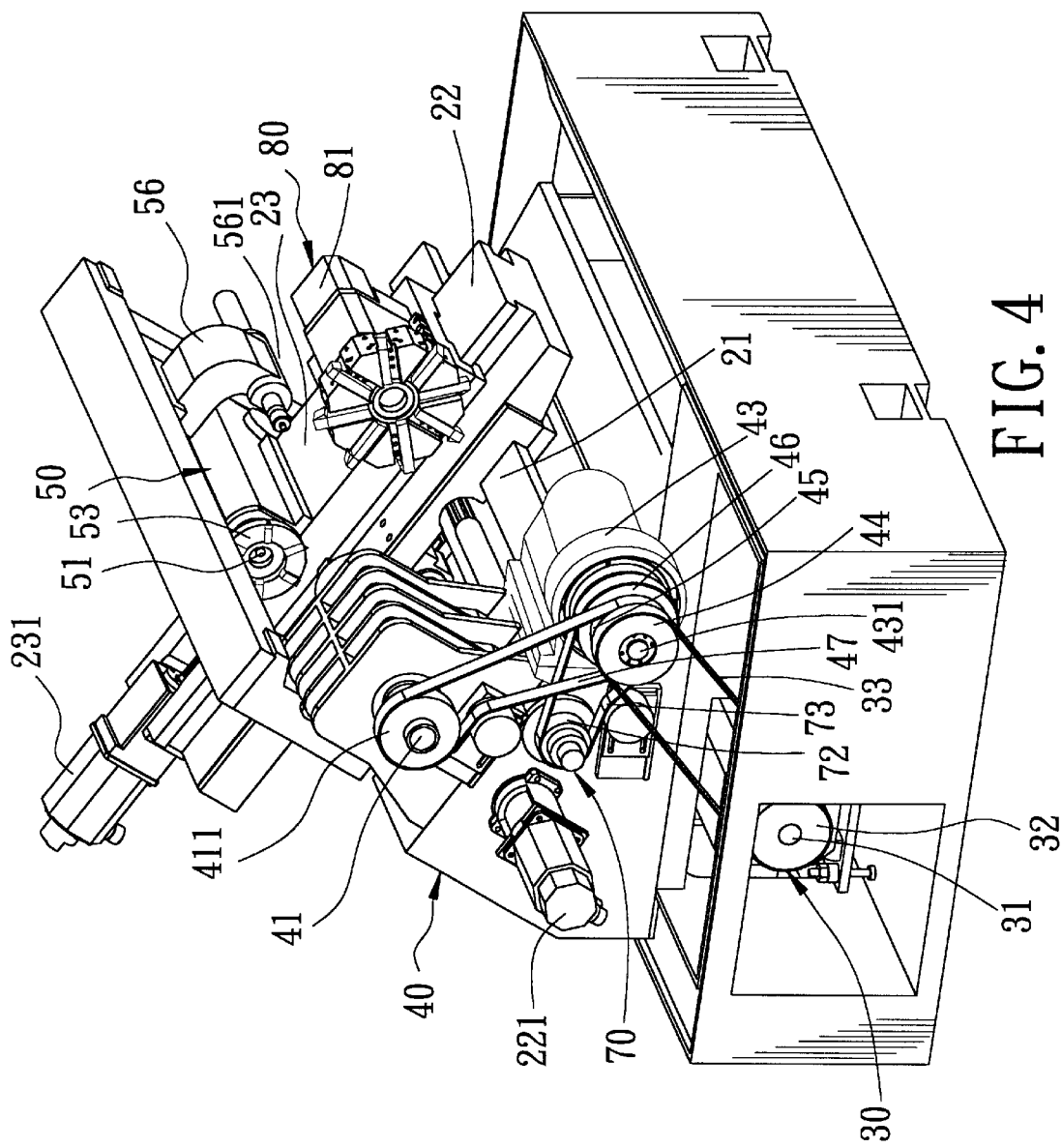
FIG. 4 is a perspective view of the preferred embodiment, illustrating how an electromagnetic clutch is connected to a driving source, a driving shaft and a spindle.
Figure 5:
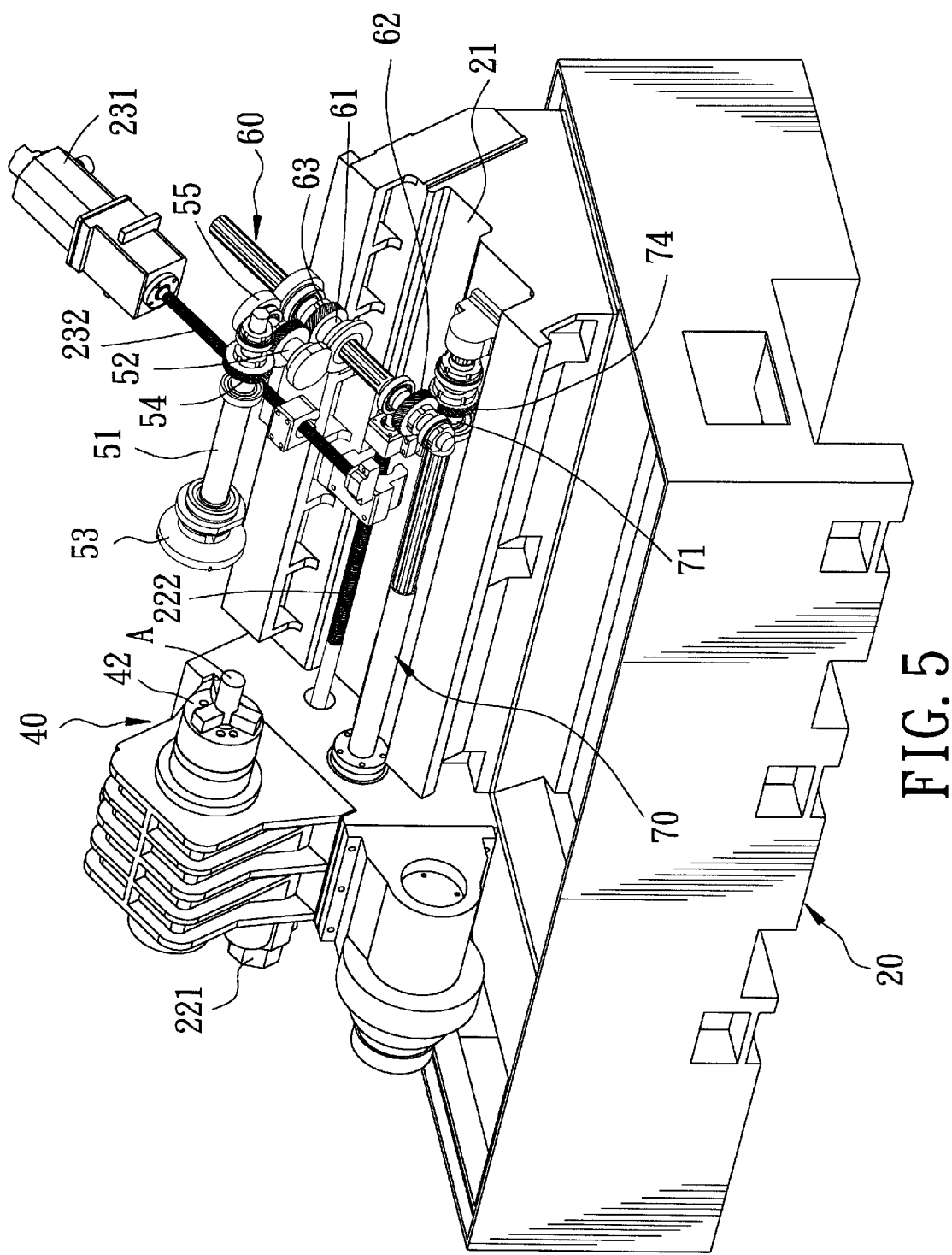
FIG. 5 is a perspective view of the preferred embodiment, in which some elements, including first and second casings, are removed to illustrate a transmission between a polygon machining cutter unit and the driving shaft.

Referring to FIGS. 3, 4 and 5, the preferred embodiment of a lathe according to this invention is shown to include a machine body 20, a driving source or motor unit 30, a headstock 40, a cutter seat 50, a rigid driven shaft 60, a rigid driving shaft 70 and a turret unit 80. The motor unit 30 and the headstock 40 are disposed on the machine body 20. A spindle 41 is journalled on the machine body 20, and is attached to the spindle 41 in a known manner for holding a workpiece (A) (see FIG. 5) to be machined. The driven shaft 60 and the driving shaft 70 are journalled on the machine body 20, and extend respectively in longitudinal and transverse directions of the spindle 41. The machine body 20 has a top surface, which is formed with a slide slot 21. An inclined transverse rail member 22 is disposed slidably on the machine body 20, and can be driven by a motor unit 221 to move along the slide slot 21. The motor unit 221 has an externally threaded motor shaft 222, which engages threadedly an internally threaded portion (not shown) of the rail member 22. A cutter carrying plate 23 is disposed slidably on the rail member 22, and can be driven by a motor unit 231 to move along a longitudinal direction of the same. The motor unit 231 has an externally threaded motor shaft 232 (see FIG. 5), which engages threadedly an internally threaded portion (not shown) of the carrying plate 23. The cutter seat 50 and the turret unit 80 are attached to the carrying plate 23, and are spaced apart from each other in a longitudinal direction of the rail member 22. The turret unit 80 is driven by a motor unit 81 to lathe the workpiece (A), e.g. form threads on the latter.

The driving motor unit 30 is provided with a motor shaft 31, and a belt pulley 32 that is mounted fixedly on the motor shaft 31.

A clutch device interconnects the spindle 41 and the driving shaft 70, and can be moved between a connecting position, where rotation is transferred between the spindle 41 and the driving shaft 70 so as to rotate the driving shaft 70, and a disconnecting position, where rotation of the driving shaft 70 is stopped.

In this embodiment, the clutch device includes an eletromagnetic clutch 43, and endless first, second and third belts 33, 47, 73. The clutch 43 has a rotating shaft 431, an outer pulley 44, an inner pulley 45 and a driving pulley 46. The rotating shaft 431 is journalled on the machine body 20. The outer and inner pulleys 44, 45 are sleeved fixedly on the rotating shaft 431. The first belt 33 is trained on the pulley 32 of the driving motor unit 30 and the outer pulley 44. The second belt 47 is trained on the inner pulley 45 and a driven pulley 411 that is sleeved fixedly on the spindle 41. The third belt 73 is trained on the driving pulley 46 and a driven pulley 72 that is sleeved fixedly on an end of the driving shaft 70. The driving pulley 46 is sleeved rotatably on the rotating shaft 431, and can be moved between a driving position, where the driving pulley 46 is locked on the rotating shaft 431 for transferring rotation of the rotating shaft 431 to the driving shaft 70, and an idle position, where the driving pulley 46 is unlocked from the rotating shaft 431 for stopping rotation of the driving shaft 70.

A cutter shaft 51 is journalled on the cutter seat 50, and is connected fixedly to a polygon machining cutter unit 53. A tailstock 56 is disposed on the machine body 20 for extension of a push needle 561 therein.

Figure 6:
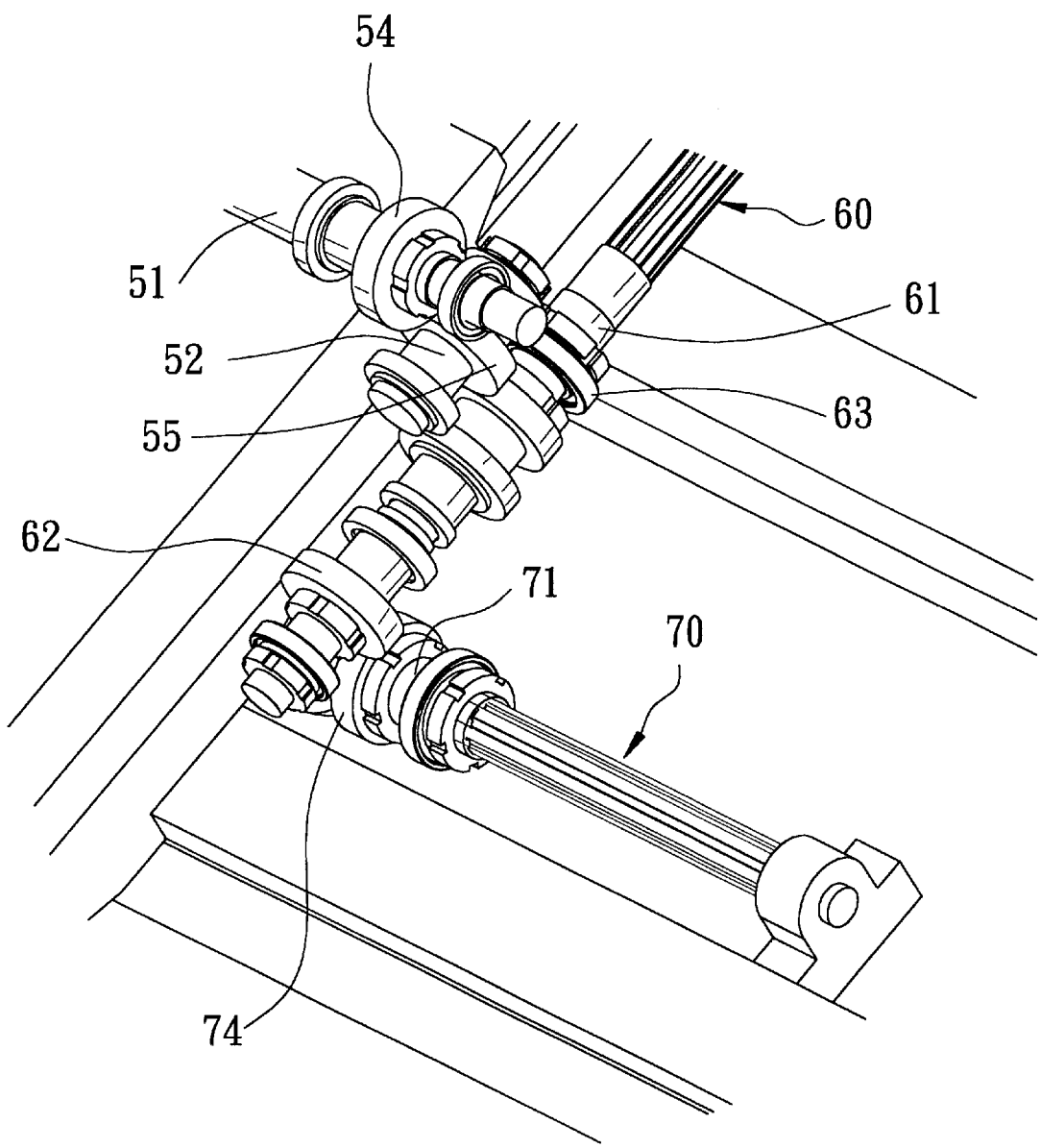
FIG. 6 is a perspective view of first and second gearings of the preferred embodiment.

A first gearing interconnects the driving shaft 70 and the driven shaft 60 for transferring rotation from the driving shaft 70 to the driven shaft 60. In this embodiment, the first gearing includes a first sleeve 71, a first driving gear 74, a first driven gear 62 and a first casing (C1) (see FIG. 3). The first casing (C1) is removed from FIG. 5 for the sake of illustrating connection between the first driving gear 74 and the first driven gear 62, which is best shown in FIG. 6. The driving shaft 70 is externally splined. The first sleeve 71 is internally splined, and is sleeved axially and movably on the driving shaft 70 for rotating synchronously with the driving shaft 70. The first driving gear 74 is sleeved fixedly on the first sleeve 71. The first driven gear 62 is sleeved fixedly on the driven shaft 60, and meshes with the first driving shaft 74 for transferring rotation between the driving shaft 70 and the driven shaft 60. The first casing (C1) is disposed axially and movably around the driving shaft 70 for confining the first driving gear 74 and the first driven gear 62 therein while preventing relative movement between the first driving gear 74 and the first driven gear 62.

A second gearing interconnects the driven shaft 60 and the cutter shaft 51, and is movable on the driven shaft 60 for transferring rotation from the driven shaft 60 to the cutter shaft 51. In this embodiment, the second gearing includes a second sleeve 61, a second driving gear 63, an intermediate shaft 52, an intermediate gear 55, a second driven gear 54, and a second casing (C2) (see FIG. 3). The second casing (C2) is removed from FIG. 5 for the sake of illustrating the remaining parts of the second gearing, which are best shown in FIG. 6. The driven shaft 60 is externally splined. The second sleeve 61 is sleeved axially and movably on the driven shaft 60. The intermediate shaft 52 is journalled on the machine body 20, and is disposed over and parallel to the driven shaft 60. The intermediate gear 55 is sleeved fixedly on the intermediate shaft 52, and meshes with the second driving gear 63. The second casing (C2) is disposed axially and movably around the driven shaft 60 for confining the second driving gear 63, the intermediate gear 55 and the second driven gear 54 therein while preventing movement of the intermediate gear 55 and the driven gear 54 relative to the second driving gear 63.

When it is desired to adjust the position of the cutter seat 50 and the turret unit 80 relative to the chuck 42 and the workpiece (A), the motor units 221, 231 are actuated to move the rail member 22 along the slide slot 21 and the cutter carrying plate 23 on the rail member 22. Because the driving shaft 70 is relatively long, the permissible greatest length of the workpiece (A) is increased.

The driving shaft 70, the first driving gear 74, the first driven gear 62, the driven shaft 60, the second driving gear 63, the intermediate gear 55 and the second driven gear 55 constitute cooperatively a mechanical transmission between the cutter shaft 51 and the spindle 41. As such, the polygon machining cutter unit 53 can be fed at appropriate times even when it is used to machine a workpiece that is made of a relatively hard material and even when the feeding distance is relatively large, thereby increasing the machining precision.

With this invention thus explained, it is apparent that numerous modifications and variations can be made without departing from the scope and spirit of this invention. It is therefore intended that this invention be limited only as indicated by the appended claims.

I claim:

1. A lathe comprising:

a machine body including a spindle that is journalled thereon, and a chuck that is adapted to hold a workpiece to be machined;

a transverse rail member disposed slidably on said machine body and extending in a transverse direction relative to said spindle, said rail member being movable on said machine body along a longitudinal direction of said spindle;

a cutter carrying plate disposed slidably on said rail member and movable along a longitudinal direction relative to said rail member;

a turret unit attached to said carrying plate and adapted to lathe the workpiece;

a polygon machining cutter unit attached to said carrying plate and spaced apart from said turret unit in the longitudinal direction of said rail member, said polygon machining cutter unit being adapted to form a plane on the workpiece;

a cutter shaft attached fixedly to said polygon machining cutter unit and disposed parallel to said spindle;

a rigid driving shaft journalled on said machine body and disposed parallel to said spindle;

a driving source for rotating said spindle;

a clutch device movable between a connecting position, where rotation is transferred between said spindle and said driving shaft so as to rotate said driving shaft, and a disconnecting position, where rotation of said driving shaft is stopped;

a rigid driven shaft journalled on said machine body and extending in the transverse direction relative to said spindle;

a first gearing interconnecting said driving shaft and said driven shaft and movable on said driving shaft for transferring rotation from said driving shaft to said driven shaft; and a second gearing interconnecting said driven shaft and said cutter shaft and movable on said driven shaft for transferring rotation from said driven shaft to said cutter shaft.

2. The lathe as claimed in claim 1, wherein said driving source includes a motor unit, said clutch device including:

an electromagnetic clutch including a rotating shaft that is journalled on said machine body, and a driving pulley which is sleeved rotatably on said rotating shaft and which is movable between a driving position, where said driving pulley is locked on said rotating shaft, and an idle position, where said driving pulley is unlocked from said rotating shaft;

an endless first belt trained on said motor unit and said rotating shaft of said electromagnetic clutch for rotating said rotating shaft;

an endless second belt trained on said rotating shaft of said electromagnetic clutch and said spindle for rotating said spindle; and an endless third belt trained on said driving pulley of said electromagnetic clutch and said driving shaft for rotating said driving shaft only when said driving pulley is at said driving position.

3. The lathe as claimed in claim 1, wherein said driving shaft is externally splined, said first gearing including:

an internally splined first sleeve, which is sleeved axially and movably on said driving shaft for rotating synchronously with said driving shaft;

a first driving gear sleeved fixedly on said first sleeve;

a first driven gear sleeved fixedly on said driven shaft and meshing with said first driving gear for transferring rotation between said driving shaft and said driven shaft; and a first casing disposed axially and movably around said driving shaft for confining said first driving gear and said first driven gear therein while preventing relative movement between said first driving gear and said first driven gear.

4. The lathe as claimed in claim 1, wherein said driven shaft is externally splined, said second gearing including:

an internally splined second sleeve, which is sleeved axially and movably on said driven shaft;

a second driving gear sleeved fixedly on said second sleeve;

an intermediate shaft journalled on said machine body and disposed over and parallel to said driven shaft;

an intermediate gear sleeved fixedly on said intermediate shaft and meshing with said second driving shaft;

a second driven gear sleeved fixedly on said cutter shaft and meshing with said intermediate gear; and a second casing disposed axially and movably around said driven shaft for confining said second driving gear, said intermediate gear and said second driven gear therein while preventing movement of said intermediate gear and said second driven gear relative to said second driving gear.

* * * * *